Nov. 24, 1970   R. W. CHANG   3,543,177
DIGITAL FREQUENCY COMPARATOR
Filed Dec. 27, 1968   2 Sheets-Sheet 1

INVENTOR
R. W. CHANG
BY
J. P. Kearns
ATTORNEY

Nov. 24, 1970   R. W. CHANG   3,543,177
DIGITAL FREQUENCY COMPARATOR
Filed Dec. 27, 1968   2 Sheets-Sheet 2 and
Berkeley Heights, N.J., a corporation of New York
Filed Dec. 27, 1968, Ser. No. 787,463
Int. Cl. H03b *3/04;* H03d *13/00*
U.S. Cl. 331—25                                    7 Claims

ABSTRACT OF THE DISCLOSURE

Method and apparatus for comparing closely spaced frequencies of electrical waves in the presence of noise and other interference and for determining which of two such frequencies is the higher. One frequency is taken as the reference and the other, as the unknown. In a first mode a tentative evaluation is made by comparing zero-crossing pulses derived from transitions of the same sense from each wave until a repetition of pulses from one of the waves occurs. In a second mode a final evaluation is made by comparing zero-crossing pulses derived from transitions of opposite sense from each wave until a repetition of pulses from one of the waves again occurs. The frequency corresponding to the wave in which the repetition occurs in the second mode is then known to be the higher in frequency of the two. The method is implemented in digital apparatus which automatically switches between operating modes.

FIELD OF THE INVENTION

This invention relates generally to electric wave frequency detectors and comparators and specifically to digital frequency comparators.

BACKGROUND

In the fields of electrical frequency measurement, automatic frequency control and the identification of command and supervisory signals in communications and telemetry systems, it becomes necessary to discriminate between unknown frequencies in the presence of noise and other types of interference. As long as there exists sufficient frequency spacing between pairs of such frequencies to be distinguished, conventional low-pass, high-pass or bandpass filters can be employed to separate one member of the pair from another. However, the closer the ratio between the members of such a pair of frequencies approaches unity, the more difficult it becomes to construct a filter with sharp enough cut-off to separate them. Furthermore, a given filter can only separate frequencies lying on either side of a specific cut-off value. Therefore, the cut-off values must lie between the two frequencies being distinguished.

Frequencies may also be distinguished digitally by counting the number of cycles or transitions occurring in a predetermined unit of time. This digital method has the disadvantage that counting must be carried out over a larger and larger number of cycles as the ratio between the frequencies to be distinguished approaches unity.

Other conventional frequency detectors, such as phase-shift discriminators and ratio detectors, exhibit similar disadvantages as the ratio between frequencies approaches unity.

It is an object of this invention to distinguish accurately and reliably between electric waves having frequency components with arbitrarily close frequency spacing in the presence of noise and other perturbations.

It is another object of this invention to determine which of two unknown frequencies is the higher in frequency in the minimum of decision time regardless of the ratio between them.

It is still another object of this invention to detect frequency differences over a wide frequency range automatically and without requiring any alteration in the detecting apparatus.

It is a further object of this invention to provide an accurate and reliable frequency comparator by a unique combination of conventional digital circuits.

SUMMARY OF THE INVENTION

According to this invention, unknown electric wave frequencies are discriminated digitally in the presence of noise and other interference by sequentially comparing zero axis-crossing transitions in pairs of such waves. Such comparison is carried out in two modes. In a first mode pulses derived from axis-crossings of the same sense, e.g., positive-going, from each of two waves to be compared are sequentially counterposed until pulses from the same wave directly follow one another. At this time the two waves are in the proper relative phase to effect a final determination of which wave has the higher frequency component. A second mode of comparison is immediately instituted. In the second mode pulses derived from axis-crossings of opposite sense, e.g., positive-going in one wave and negative-going in the other wave, from the respective waves to be compared are sequentially counterposed until pulses from the same wave directly follow one another. At this juncture the decision is made that the wave whose pulses repeat without an intervening pulse derived from the other wave contains the higher frequency component. The difference frequency, if required, is obtained in a conventional manner by beating one wave against the other.

In an illustrative embodiment of this method of frequency comparison, well-known digital circuits are employed for implementation. Pulses are derived from zero axis-crossing transitions in Schmitt trigger circuits in combination with differentators. The derived pulses are counterposed in a bistable multivibrator which is specially implemented to produce an output only when successive pulses are applied to the same input. The sense of the output provides an indication of which input corresponds to the higher frequency. Switching from the first to the second mode of comparison is readily implemented by having the bistable multivibrator drive a complementing flip-flop which in turn controls an inverting circuit in the input of one of the Schmitt trigger circuits.

A feature of the implementing apparatus is the blocking of the input to the bistable multivibrator whenever pulses from the two waves occur substantially simultaneously. Thus, incorrect decisions are prevented in this circumstance. For this purpose biased diodes are placed in series with the inputs to the bistable multivibrator and a monstable multivibrator generates a momentary blocking bias for these diodes when substantially coincident pulses are produced by the two pulse trains being compared.

Another feature of the invention is that no frequency dependent components are required in the illustrative embodiment and therefore the frequency comparator can cover a wide frequency band of operation, e.g., comparing any two frequencies in the frequency range from 0 to 10 mHz. The only limitation on the frequency band is the response time of the decision multivibrator. This limitation is, however, a practical, but not a theoretical, one.

A further feature of the invention is that the correct decision is made even when the zero crossings of one of the waves shift by a relatively large amount in any random or systematic manner from their expected noise-free positions.

An additional feature of this invention is that the frequency comparator can be used in a frequency control loop to cause one frequency to track another automatically.

DESCRIPTION OF THE DRAWINGS

Many other objects, features and advantages of this invention will become apparent from considering the following detailed description in conjunction with the drawing in which.

DETAILED DESCRIPTION

Figure 1:
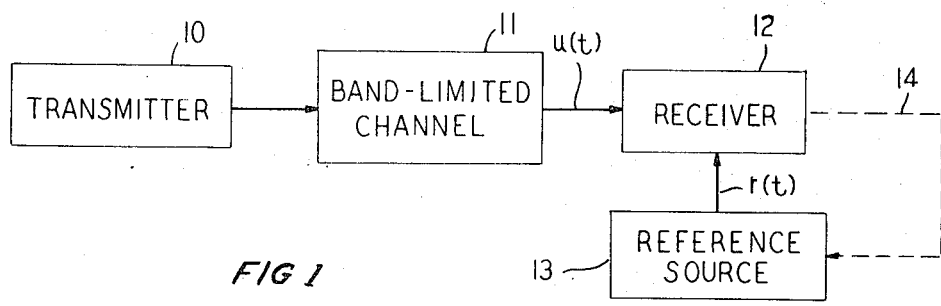
FIG. 1 is a block diagram of an electric wave transmission system in which discrete tone signals must be accurately distinguished from other tones, noise and interference.

FIG. 1 is a block diagram of a representative transmission system including a transmitter 10, a transmission channel 11 and a receiver 12. Tone signals generated in transmitter 10 are transmitted serially through limited-bandwidth channel 11 for reception and decoding in receiver 12. In passing through channel 11 various channel noises and spurious tones are added to the transmitted signal so that the problem of identifying the desired tone in the presence of such interfering signals is presented. The desired information signal $u(t)$ may be further subject to frequency offset and phase delay. Let the approximate center of the band be designated by the frequency $f_r$ and generate that frequency at the receiver in reference source 13, thus creating the signal $r(t)$. The desired information signal frequency $f_u$ lies within either one of two frequency bands.

$$f_1 < f_u < f_r - \Delta f \quad (1)$$

$$f_r + \Delta f < f_u < f_2 \quad (2)$$

The statistical distribution of $f_u$ in these two frequency bands is unknown. Furthermore, $\Delta f$ can be so small that it is impracticable to separate these two frequency bands by conventional filtering means. The receiver is required to decide in which of frequency bands (1) or (2) the information frequency is transmitted, i.e., whether $f_u > f_r$ or $f_u < f_r$.

In a practical situation channel 11 may be used for the transmission of command or supervisory signals in a telemetry or communication system. The transmitted frequency may be one of two nominal frequencies $f_A$ or $f_B$. The receiver takes action A if frequency $f_A$ is detected, or action B if frequency $f_B$ is received. Although the nominal frequencies are either $f_A$ or $f_B$, the actual received freqeuncies may be $f_A + y_A$ or $f_B + y_B$, where $y_A$ and $y_B$ are random frequency translations due to factors such as frequency offset in channel 11 or environmental effects in the transmitting oscillators. Assume $f_A > f_B$. If the received signal is such that $$f_A + y_A > f_B + y_B \quad (3)$$

for all possible values of $y_A$ and $y_B$, the receiver may compare the received signal with a locally generated tone or frequency $f_r$ to determine whether $f_A$ or $f_B$ is being transmitted. Reference frequency $f_r$ is then selected such that $$f_A + y_A > f_r > f_B + y_B \quad (4)$$

The comparison must usually be made in the presence of noise. The feedback connection 14 will be discussed below.

Figure 2:
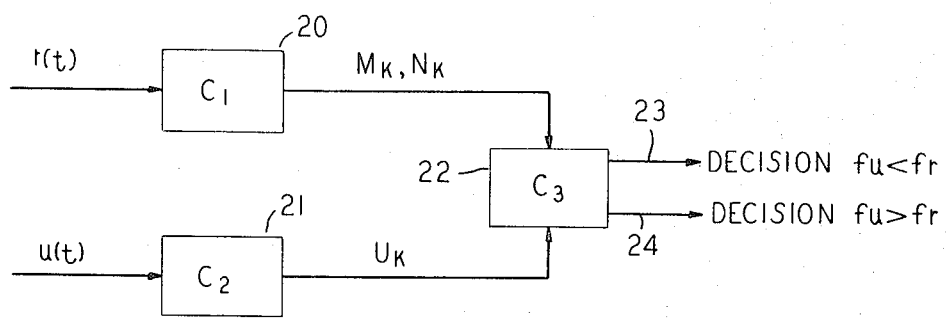
FIG. 2 is a simplified block diagram of the detector of this invention and illustrative of its principle.

FIG. 2 is a generalized block diagram of the decision circuit of the frequency comparator of this invention. The comparator comprises broadly a pulse generator $C_1$ as represented by block 20 driven by the reference signal $r(t)$, a pulse generator $C_2$ as represented by block 21 driven by the information signal $u(t)$ and logic circuit $C_3$ represented by block 22 and having as inputs the outputs of pulse generators 20 and 21. The outputs of logic circuit 22 appear on leads 23 or 24 depending on whether the decision is made that $f_u < f_r$ or $f_u > f_r$.

Figure 3:
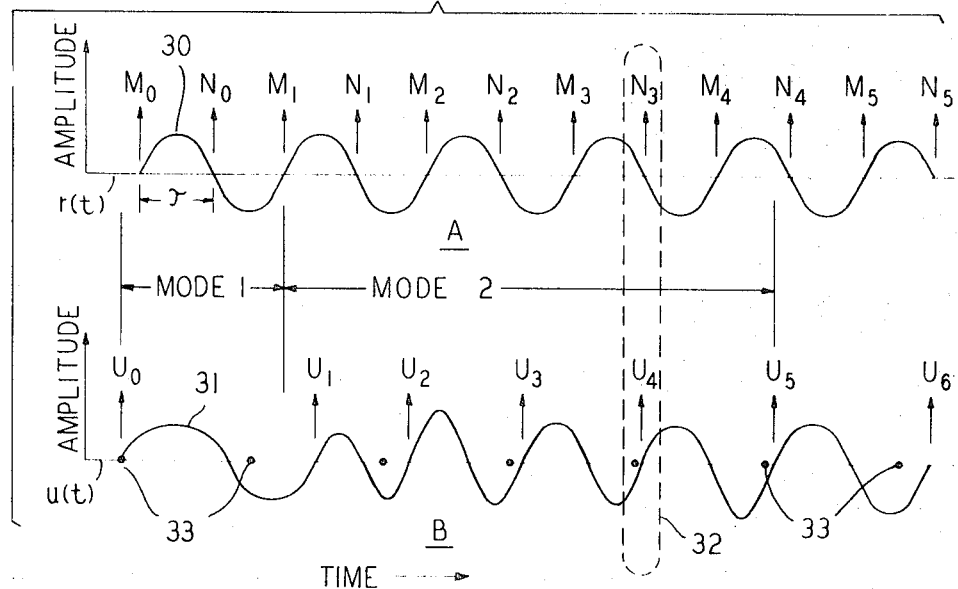
FIG. 3 is a waveform diagram useful in explaining the operation of this invention.

For purposes of explanation waveforms of typical waves $r(t)$ and $u(t)$ are shown in FIG. 3 on lines A and B respectively, which have a common time base. Line A of FIG. 3 shows the reference wave $r(t)$ as a substantially symmetrical sine wave 30 with zero axis-crossings at intervals $\tau = 1/(2f_r)$. Its upward or positive-going zero crossings are defined by arrowheads $M_k$ and its downward or negative-going zero crossings by arrowheads $N_k$. Since $r(t)$ is generated locally, it is assumed to be largely interference free. Line B of FIG. 3 shows a representative information signal $u(t)$ as a wave 31 distorted both in phase and amplitude by channel distortion and interference. Its upward or positive-going zero crossings are represented by arrowheads $U_k$.

In the comparator circuit of FIG. 2 it is the function of circuit $C_2(21)$ to generate the pulses $U_k$ from information wave $u(t)$. Pulses $U_k$ trigger logic circuit 22. The time instant at which pulses $U_k$ trigger $C_3$ is denoted $u_k + x_k$, where $u_k$ is the interference-free position of a pulse $U_k$ and $x_k$ is the random shift of the $k$th upward zero crossing due to interference and noise. The shift $x_k$ can be either positive or negative. Thus, $$u_{k+1} = u_k + 1/f_u \text{ for all } k \quad (5)$$

It is similarly the function of circuit $C_1$ in FIG. 2 to generate the pulses $M_k$ at the $k$th upward zero crossings of reference wave $r(t)$. In addition, pulses $N_k$ are generated at the $k$th downward zero crossings. Pulses $M_k$ and $N_k$ are applied to circuit $C_3$ at time instant $m_k$ and $n_k$. On the assumption that signal $r(t)$ is a symmetrical sine wave $$n_k = m_k + 1/(2f_r) \quad (6)$$

In the event that wave $r(t)$ is not symmterical pulses $N_k$ may be generated at times $m_k + \tau$ (where $\tau$ is a fixed value equal to the average half-period between $m_k$ and $m_{k+1}$) rather than at the actual downward zero crossing instants.

Logic circuit $C_3$ is triggered only on positive pulses. On the assumption that pulses $M_k$ and $N_k$ derived from wave $r(t)$ are derived in a differentiating circuit they will be of opposite polarity. Logic circuit $C_3$ is operated in two modes. In mode 1 it is triggered by $N_k$ and $U_k$, but not by $N_k$. In mode 2 it is triggered by $N_k$ and $U_k$, but not by $M_k$. In order to avoid the difficult task of resolving closely spaced pulses, provision may be made to block pulses from the two waves from triggering circuit $C_3$ when they are separated by an arbitrary $d$ seconds or less. In FIG. 3 pulses $N_3$ and $U_4$ linking by dashed oval 32 occur substantially simultaneously and would be difficult to separate. They are therefore suppressed and prevented from triggering circuit $C_3$.

After the occurrence of $U_k$ and $M_k$ or $N_k$ pulses within $d$ seconds and their immediate deletion as just described, the remaining pulses continue to trigger circuit $C_3$ sequentially. When successive pulses derived from the same wave trigger $C_3$ consecutively, a pulse repetition is said to take place. In mode 1 the repetition of either U-pulses or M-pulses is arranged to switch the comparator to mode 2 operation. In mode 2 the reptition of either U-pulses or N-pulses results in a decision as to whether $f_u$ is greater or less than $f_r$. The rule of decision in mode 2 is: if the U-pulses repeat, $f_u$ is greater than $f_r$; if the N-pulses repeat, $f_u$ is less than $f_r$.

After the decision is made in mode 2, the cycle is complete and the comparator is restored to mode 1 in preparation for a further decision cycle. As will appear later, repeated reliable decisions will continue to be made in both modes, after the initial mode 1, as long as the two input waves are applied to the comparator. The appropriate decision lead will continue to be pulsed cyclically in this circumstance. The decision rule is illustrated by concrete example illustrated in FIG. 3 where pulses U and M occur in the following initial sequence $U_0M_0M_1U_1$. A pulse repetition $M_0M_1$ occurs between pulses $U_0$ and $U_1$, and an output is arranged to appear on lead 24. Since this is mode 1, it is not regarded as a decision as to whether $f_r$ is higher in frequency than $f_u$. A reliable decision can be made in mode 1 only if unknown frequency $f_u$ is interference-free. Instead circuit $C_1$ is primed to invert its output and operation in mode 2 commences immediately after pulse $M_1$. From FIG. 3 pulses $U_k$ and $N_k$ now occur in sequence as follows:

$$U_1N_1U_2N_2U_3(U_4N_3)U_5N_4$$

Because of the close spacing of pulses $U_4$ and $N_3$, i.e., within $d$ seconds, they are deleted as indicated by the parentheses. Thus, the pulses $U_3$, $U_5$ are regarded as repetitions and the decision is made accordingly that $f_u$ is higher in frequency than $f_r$. It is apparent that a decision that $f_r > f_u$ based on the M-pulse repetition in mode 1 would have been erroneous. One decision cycle is complete at pulse $U_5$. Thereafter, circuit $C_3$ reverts to mode 1.

The method outlined above is valid whether $f_u$ is greater or less than $f_r$ and whatever the ratio between $f_u$ and $f_r$ as long as the maximum deviation $x_{max} - x_{min}$ of the U-pulses from their interference-free positions is within certain bounds, where $x_{max}$ and $x_{min}$ are respectively the most positive and most negative deviations in seconds of the zero-crossings from their interference-free positions. Evenly spaced dots 33 placed along the time axis on line B of FIG. 3 indicate the interference-free positions of the upward zero crossing of $u(t)$. It is obvious that waves $r(t)$ and $u(t)$ may be square waves with fundamental frequencies $f_r$ and $f_u$.

An intuitive evaluation of the method of this invention shows that if the two waves being compared are interference-free, then a counterposing of zero crossings of the same sense will indicate which is the higher in frequency as soon as consecutive zero crossings of the lower frequency wave straddle two consecutive zero crossings of the higher-frequency wave. If one of the waves is subject to interference such that its zero crossings wander in some unpredictable manner and the ratio $f_u/f_r$ is close to unity, it is easy to see how a small displacement of one zero crossing in one direction and a small displacement of the next zero crossing in the opposite direction will yield an erroneous decision as to which wave is the higher in frequency. However, when the two waves are in such a position as to cause one set of zero crossings to appear to straddle the other, then they are very nearly in phase. Accordingly, by changing to mode 2 to compare zero crossings of opposite sense the two waves are shifted in relative phase by about 180 degrees to place the lower frequency wave in advance of the higher frequency wave. Then, when the higher frequency wave catches up with the lower frequency wave all doubts as to which wave is the higher in frequency are dispelled because the zero crossings of the higher frequency wave would have to be more than 90 degrees away from their interference-free positions before an erroneous decision could be made. The two-look frequency comparison method of this invention achieves a wide margin against an erroneous decision. The probability of making the correct decision is in fact unity within a very liberal upper bound as against a probability of 0.5 for a single look method.

Using the notation $T_r = 1/f_r$ and $T_u = 1/f_u$, it can be shown from a process of logical deduction that the correct decision will be made by the method of this invention if (1) when the ratio $f_u/f_r = T_r/T_u$ lies in the range 0.8 to 1.2

$$X_{max} - X_{min} < \left[0.5 - 1.5\left|1 - \frac{T_r}{T_u}\right|\right]T_u - 2d, \text{ and} \quad (6)$$

(2) when the ratio $f_u/f_r$ lies outside the range 0.8 to 1.2

$$x_{max} - x_{min} < |T_u - T_r| \quad (7)$$

By means of Equation 6 it can be calculated for an example where ratio $f_u/f_r = 1.01$ that $x_{max} - x_{min}$ can be as large as 0.485 $T_u$, assuming that the spacing $d$ between canceled pulses is negligible with respect to $T_r$. This signifies that the upward zero crossings of $u(t)$ can shift in phase from their interference-free positions in any systematic or random manner to the right or left (with respect to line B of FIG. 3) by as much as 87.3 degrees.

It can further be shown that when Equation 6 is satisfied and the ratio $f_u/f_r$ is within the range 0.8 to 1.2, the correct decision will be made in mode 2 with not more than the integral number next larger than $$(2T_r - d)/(T_u - T_r)$$

of U-pulses to be compared when $f_u < f_r$, or with not more than the integral number next larger than $$(T_r + T_u - d)/(T_r - T_u)$$

when $f_u > f_r$. These values are maximal and represent the worst case. Average decisions will be made more rapidly.

It can also be observed from Equation 6 that an increase in $d$ reduces the allowable deviation $x_{max} - x_{min}$. Therefore, $d$ should be kept as small as possible, preferably in the nanosecond range. It may be noted that the $d$ term is absent from Equation 7.

Figure 4:
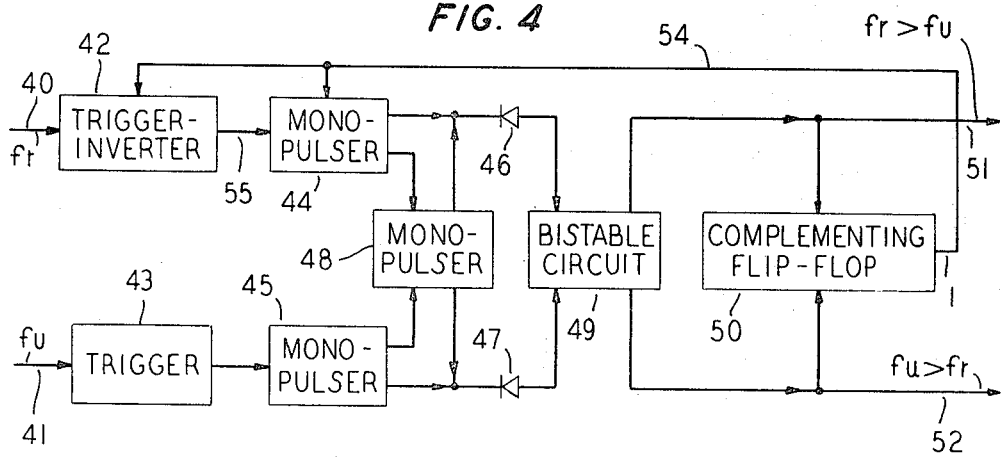
FIG. 4 is a block diagram of an illustrative embodiment of the frequency comparator of this invention using digital circuits.

FIG. 4 is an illustrative embodiment in block diagram form of an apparatus for carrying out the frequency comparison method of this invention. The apparatus comprises Schmitt triggers 42 and 43, one of which includes an inverter; three monostable multivibrators (monopulsers) 44, 45 and 48; and two bistable multivibrators 49 and 50, one of which (50) is connected for complementing by successive pulses. Triggers 42 and 43 will be understood to include differentiating resistance-capacitance circuits in their outputs to produce narrow pulses. In view of the wide availability of prepackaged digital circuit modules and of the continued refinement of integrated circuit techniques, it is apparent that the apparatus of FIG. 4 can be implemented in small size and at low cost.

The apparatus of FIG. 4 operates in the following manner. The reference signal $r(t)$ having the principal frequency component $f_r$ is applied on line 40 to trigger-inverter 42. The substantially sinusoidal frequency component $r(t)$ is converted by the conventional Schmitt trigger threshold (set at zero level) circuit into a square wave. A differentiator included (but not shown) in block 42 produces a positive pulse $M_k'$ at the $k$th upward zero crossing of $r(t)$, and a negative pulse $N_k'$ at the $k$th downward zero crossing of $r(t)$. These pulses appear on output lead 55. Block 42 is also supplied with an invertor controlled by signals fed back on lead 54 from the output of complementing flip-flop 50. The feedback voltage on lead 54 may assume one of two levels. At one level (corresponding to mode 1 operation) the inverter passes differentiated pulses $M_k'$ and $N_k'$ to lead 55 without altering their polarities. At the other level (corresponding to mode 2 operation) the inverter reverses the polarities of differentiated pulses $M_k'$ and $N_k'$. Positive pulses only on lead 55 trigger monopulser (one-shot multivibrator) 44. In mode 1 monopulser 44 is triggered by $M_k'$ pulses only and in mode 2, by $N_k'$ pulses only.

In a similar manner the unknown signal $u(t)$ having the principal frequency component $f_u$ is applied on line 41 to trigger circuit 43. Trigger 43 is similar to trigger 42 and includes a differentiator but not an inverter.

The rectangular wave generated from the zero crossings in $u(t)$ by the Schmitt trigger in circuit 43 is differentiated to produce positive pulses $U_k'$ at the upward zero crossings. The downward zero crossings occurring in $u(t)$ are of no interest. The positive pulses $U_k'$ trigger monopulser 45 in both of modes 1 and 2.

In mode 1 operation pulses $M_k'$ trigger monopulser 44 to generate rectangular pulses of fixed, but arbitrary, width. These rectangular pulses are differentiated to generate positive pulses $M_k''$ followed by negative pulses $M_k$. Pulses $M_k''$ appear on the lower output lead of monopulser 44 and pulses $M_k$ on the upper lead, which is connected to the cathode of diode 46. Similarly, pulses $U_k'$ trigger monopulser 45 to generate rectangular pulses of the same fixed, but arbitrary, width as those from monopulser 44. These pulses are in turn differentiated to produce positive pulses $U_k''$ followed by negative pulses $U_k$. Positive pulses $U_k''$ appear on the upper output lead, and negative pulses $U_k$ on the lower output lead, from monopulser 45.

Monopulser 48 accepts pulses $M_k''$ on its upper input lead and pulses $U_k''$ on its lower input lead. It is biased so that a substantial coincidence of an $M_k''$ and a $U_k''$ pulse causes it to change state and generate a positive pulse simultaneously on its two output leads. This pulse is applied to the cathodes of diodes 46 and 47 to bias them into their low-conduction or blocking condition, thereby preventing the transmisison of either an $M_k$ or a $U_k$ pulse to bistable flip-flop 49. A separately occurring $M_k''$ or $U_k''$ pulse will be ineffective to operate monopulser 48. Accordingly, the corresponding later-occurring $M_k$ or $U_k$ pulse will be transmitted through diode 46 or 47 to flip-flop 49, whenever pulses $M_k''$ or $U_k''$ do not overlap within $d$ seconds.

Bistable flip-flop 49 is arranged, through feedback between inputs and outputs of each stage in addition to the conventional cross-coupling between stages, to produce an output only when two consecutive $M_k$ or two consecutive $U_k$ pulses trigger the same input point. Thus, the upper output lead 51 is activated when two consecutive $M_k$ pulses occur and the lower output lead 52 is activated when two consecutive $U_k$ pulses occur. No significant output occurs as long as the two inputs of flip-flop 49 are alternately triggered. In mode 1 outputs from flip-flop 49 are not interpreted as making a decision as to whether $f_u$ is greater or less than $f_r$.

The outputs of flip-flop 49 trigger complementing flip-flop 50 to signal the end of mode 1. The output appearing on lead 54 is fed back to trigger-inverter 42 and monopulser 44 as shown. Trigger-inverter 42 is switched to invert the respective $M_k'$ and $N_k'$ transition pulses derived from the reference frequency $f_r$. At the same time monopulser 44 is switched to its rest condition. Mode 2 commences automatically.

Mode 2 is the same in operation as mode 1, except that $N_k$, instead of $M_k$, pulses are compared with $U_k$ pulses. $N_k''$ and $N_k$ pulses are generated by monopulser 44 in place of $M_k''$ and $M_k$ pulses. $N_k''$ pulses are tested for coincidence with $U_k''$ pulses in monopulser 48 in a manner similar to that employed to test for coincidence of $M_k''$ and $U_k''$ pulses in mode 1. The inputs to bistable flip-flop 49 are blocked by diodes 46 and 47 in the same way in the event of such coincidence. In mode 2, however, the outputs caused by two consecutive $U_k$ or $N_k$ pulses incident on the inputs to flip-flop 49 are subject to interpretation as decisions as to whether $f_u$ is greater or lesser in frequency than $f_r$. The frequency whose derived pulses occur consecutively without an intervening pulse derived from the other frequency is the higher of the two frequencies.

When a significant second output occurs on lead 51 or 52, complementing flip-flop 50 is changed in state and the inverting signal on lead 54 to trigger-inverter 42 is removed. The apparatus is restored to the mode 1 condition and the decision cycle is complete.

Figure 5:
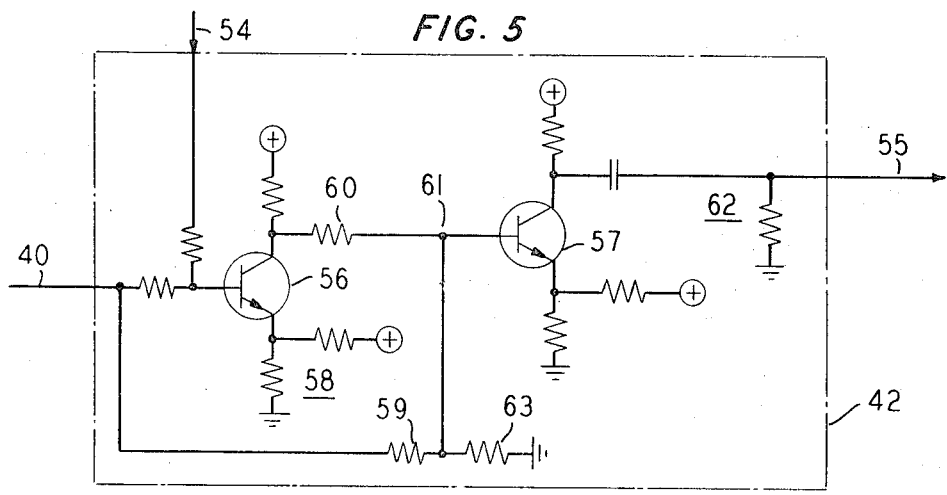
FIG. 5 is a circuit diagram of a trigger-inverter and differentiator circuit useful in the practice of this invention.

FIG. 5 is a detailed circuit diagram of a trigger-inverter useful in the practice of this invention as an embodiment of block 42 of FIG. 4. The trigger-inverter 42 comprises inverting transistor 56, trigger transistor 57 and differentiator 62. Transistor 56, shown as an npn type, is supplied with a positive bias on its emitter electrode by the voltage divider 58 across the same positive potential source which supplies a more positive bias to its collector electrode. By way of lead 54 from complementing flip-flop 50 in FIG. 4 a positive bias, intermediate between the collector and emitter biases, is applied to the base electrode of transistor 56 in mode 1 and a zero bias in mode 2. The reference wave $r(t)$ is applied to the base electrode of transistor 56 on input lead 40 by way of the isolating resistor shown. Lead 40 is also connected by way of resistor 59 to point 61, which is in turn connected to the collector electrode of transistor 56 by way of resistor 60. Point 61 is also grounded through resistor 63 as shown. Point 61 is further connected to the base electrode of transistor 57, shown by way of example as an npn type. The collector and emitter electrodes of transistor 57 are biased as shown in substantially the same manner as transistor 56. The collector electrode is coupled to the output lead 55 by way of differentiator 62, including a series capacitor and shunt resistor as shown.

In mode 1 transistor 56 is biased on by the positive control voltage on lead 54. Inputs on lead 40 are amplified and inverted in transistor 56. The signal directly connected to point 61 from input point 40 is too small to overcome the amplified signal from transistor 56. Transistor 57 inverts the signal at point 61 and its collector thus follows inputs on lead 40. Differentiator 62 thus delivers a positive pulse to output lead 55 for every upward transition on lead 40. Monopulser 44 in FIG. 4, which is driven by the signal on lead 55, responds only to positive pulses. Thus, only positive-going transitions in the input wave produce an output on lead 55 in mode 1 effective to trigger monopulser 44 in FIG. 4.

In mode 2 transistor 56 is biased off by the zero voltage on lead 54. Signals on lead 40 are insufficient to affect transistor 56. Thus, point 61 follows signals on lead 40. Transistor 56 amplifies and inverts signals at point 61. Differentiator 62 in turn produces negative spikes at positive transitions on input lead 40 and vice versa. Thus, only negative-going transitions in the input wave produce an output on lead 55 in mode 2 which is effective to trigger monopulser 44 in FIG. 4.

Figure 6:
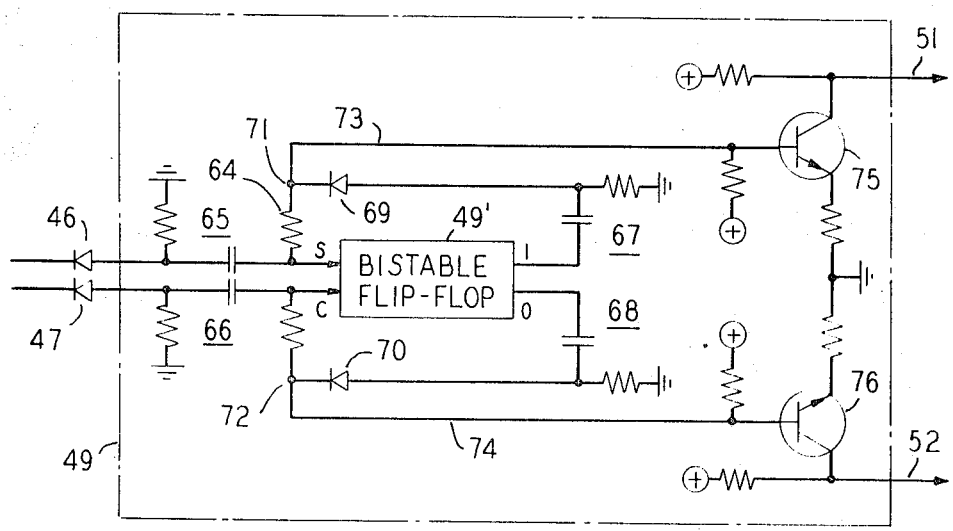
FIG. 6 is a circuit diagram of a bistable multivibrator modified to operate as a decision circuit useful in the practice of this invention.

FIG. 6 is a detailed schematic diagram of a bistable circuit modified to perform the function of block 49 in FIG. 4; namely, to produce an output only on a succession of input signals to the same input point. A conventional bistable flip-flop with interstage cross-coupling, set (S) and clear (C) inputs and complementary outputs (1) and (0) is designated 49' in FIG. 6. Input signals from monopulser 44 in FIG. 4 are applied to input S through blocking diode 46 and differentiator 65. Similarly, input signals from monopulser 45 in FIG. 4 are applied to input C through blocking diode 47 and differentiator 66. The 1 output of flip-flop 49' is coupled to lead 73 by way of differentiator 67 and diode 69. The junction of the cathode of diode 69 and lead 73 at point 71 is also connected to input S by way of resistor 64 as shown. When a negative input at S causes flip-flop 49' to change state and produce a 1 output, the latter positive output is differentiated and fed back to the point 71 through diode 69 to oppose and cancel the negative pulse connected thereto through resistor 64 and no net output appears on lead 73. When a further negative input at S occurs before an input occurs at C, flip-flop 49' remains in its previous state and no blocking pulse is delivered to point 71. Therefore, point 71 and lead 73 go negative.

When a negative pulse is incident at C, flip-flop 49' is cleared and an opposing output is coupled back to point 72 through differentiator 68 and diode 70 so that the input pulse coupled to point 72 through the resistor shown prevents any output from appearing on lead 74. A second input at C is unopposed by any feedback through diode 70 and therefore a negative pulse appears on lead 74 just as consecutive inputs at S produce a pulse on lead 73.

As long as inputs occur alternately, and not consecutively, at inputs S and C no output appears on lead 73 or 74.

Lead 73 is connected to the electrode of npn transistor 75 and lead 74, to the base electrode of npn transistor 76. Each of transistors 75 and 76 is supplied with a static base bias as shown so that they are normally in saturation and output leads 51 and 52 at their collector electrodes are at relatively low emitter potentials. However, when either of leads 73 or 74 go negative, the appropriate transistor 75 or 76 is cut off and one or the other of leads 51 or 52 goes positive.

The apparatus of FIG. 4 can be further automated in a straightforward manner by the use of conventional logic circuits so that leads 51 and 52 would not be the ultimate output. By means of AND and OR logic gates, a counter indicating the end of mode 2 and a bistable flip-flop whose state is changed only at the end of mode 2, a sustained output can be provided to show the decision made at the end of mode 2 instead of the momentary output provided by FIG. 4 as shown. The apparatus is thus employed for frequency measurement purposes.

The circuit of FIG. 4 can also be allowed to run continuously so that it alternates between mode 1 and mode 2 indefinitely. It can then be used in a frequency control loop in which the frequency $f_r$ is derived from an oscillator whose frequency can be made to follow the frequency $f_u$ by using the outputs on leads 51 and 52 to increase or decrease frequency $f_r$ accordingly. Only the initial output will be spurious. Receiver 12 and source 13 of FIG. 1 can readily be converted to automatic frequency control by regarding source 13 as the local oscillator and receiver 12 as including the comparator circuit of FIG. 4 and providing a feedback connection represented by dashed line 14 between receiver 12 and source 13. Feedback lead 14 then conveys the information obtained in the frequency comparison of waves $u(t)$ and $r(t)$ to adjust the frequency $f_r$ of the $r(t)$ wave. Thus, an automatic frequency control system with an unlimited lock-in range can be built because the frequency detector of FIG. 4 has no frequency-sensitive components.

While the principles of this invention have been described in terms of a specific illustrative embodiment, many others will occur to those skilled in the art to which it relates without departing from their spirit and scope.

What is claimed is:

1. A frequency comparator for determining which of two monotonic waves at least one of which is subject to interference and noise is the higher in frequency comprising first means generating from zero crossings in one of said waves in a first mode a first train of pulses corresponding to such crossings of one sense and in a second mode a second train of pulses corresponding to such crossings of opposite sense, second means generating a third train of pulses corresponding to zero crossings in the other of said waves of said one sense only, and a decision circuit responsive in said first mode to said first and third pulse trains developing a first output to switch said first generating means to said second mode when pulses from one of said first and third trains occur consecutively and responsive in said second mode to said second and third pulse trains developing a second output when pulses from one of said second and third trains occur consecutively, the sense of said second output indicating the wave corresponding to the pulse train in which such consecutive pulses occur to be the higher in frequency.

2. The frequency comparator defined in claim 1 in which said first and second generating means comprise Schmitt trigger circuits and said first generating means includes an inverter circuit operable in one of said operating modes.

3. The frequency comparator defined in claim 1 in which said decision circuit comprises
   a bistable multivibrator, and
   feedback means from each output point on said multivibrator to the corresponding input point for precluding any net output unless two or more consecutive input signals are incident on one of said input points.

4. The frequency comparator defined in claim 1 and a coincidence detector in circuit with said decision circuit comprising
   a first monostable multivibrator generating an output of fixed width for every pulse of one polarity in said first and second pulse trains,
   a second monostable multivibrator generating an output of the same fixed width for every pulse of said one polarity in said third pulse train,
   means differentiating the outputs of said first and second multivibrators providing pulses of one polarity corresponding to the leading edge and pulses of opposite polarity corresponding to the trailing edge of said pulses of fixed width,
   diodes poled to conduct pulses from said differentiating means corresponding to the trailing edges of the outputs of said first and second multivibrators to said decision circuit, and
   a third monostable multivibrator jointly triggered by a coincidence of pulses from said differentiating means corresponding to the leading edges the outputs of said first and second multivibrators producing an output of a polarity to back bias said diodes upon the occurrence of a coincidence of input pulses from said differentiating means.

5. The frequency comparator defined in claim 1 in which the second output of said decision circuit restores said first means to said first mode to generate repeated decisions as to which of said waves is the higher in frequency.

6. The frequency comparator defined in claim 5 in which the one of said waves is generated in a frequency controllable oscillator and repeated first and second outputs of said decision circuit are applied to said oscillator to lock its frequency to that of the other of said waves.

7. The method of comparing two waves with closely spaced frequency components to determine which is the higher in frequency comprising the steps of counterposing pulses corresponding to zero crossings of the same sense from each of said two waves until a repetition occurs in pulses from one of said waves in a first mode, and counterposing pulses corresponding to zero crossings of opposite sense from said two waves until a repetition occurs in pulses from one of said waves in a second mode, the wave which is the source of the repeated pulses in said second mode having the higher frequency.

References Cited

UNITED STATES PATENTS

| | | | |
|---|---|---|---|
| 3,376,517 | 4/1968 | Reynolds | 331—18 |
| 3,401,353 | 9/1968 | Hughes | 331—11 |

ROY LAKE, Primary Examiner

S. H. GRIMM, Assistant Examiner

U.S. Cl. X.R.

307—223, 261, 289; 328—28, 133, 136; 331—1